UNITED STATES PATENT OFFICE.

HANS JAEGER, OF WOODSIDE, AND WALTER KUENZLER, OF NEW YORK, N. Y.

MAYONNAISE OR SALAD DRESSING.

1,354,564.  Specification of Letters Patent.  Patented Oct. 5, 1920.

No Drawing.  Application filed April 14, 1920. Serial No. 373,958.

*To all whom it may concern:*

Be it known that we, HANS JAEGER, a citizen of the United States, residing at Woodside, L. I., county of Queens, and State of New York, and WALTER KUENZLER, a citizen of the United States, residing at New York City, borough of Manhattan, county and State of New York, have invented a certain new and useful Mayonnaise or Salad Dressing, of which the following is a specification.

This invention is a food composition, and, more particularly, a mayonnaise or salad dressing, which may be concocted through the use of the ingredients hereinafter described, or their equivalents, in substantially the proportions set forth, through the method of preparation outlined.

In making the salad dressing of this invention the same is carried out preferably in two distinct steps, the first of which constitutes the making of a base and the second the addition thereto of a mixture which renders the whole of a mayonnaise character.

The preferred proportions of the several ingredients of the base, by weight, are as follows:

Corn starch _____ 1 to 2 parts
Wheat powder _____ 1 to 2 parts
English mustard (powder form) _____ Less than 1 part
Salt _____ Less than 1 part
Pepper (optional) ____ Less than 1 part
Vinegar _____ 30 to 40 parts
Saffron _____ Less than 1 part
Water _____ 50 to 60 parts The corn starch and wheat powder employed together form a thickening media and these two substances are preferably employed, as both the corn starch and wheat powder are very fine and smooth and produce a smooth dressing. However, other thickening substances may be employed and the invention is not restricted so far as this thickening or body substance is concerned.

The use of pepper is optional as the mustard makes the dressing sufficiently "sharp" for the average taste, although pepper may be employed if desired. The saffron imparts a delightful taste to the dressing and at the same time lends thereto a pleasing color.

The constituents enumerated are mixed and cooked together in a suitable vessel and thereafter the mayonnaise addition is added thereto. This addition consists of the following ingredients in substantially the following proportions, by weight:

Yolks of eggs _____ 10 to 20 parts
Olive oil _____ 75 parts, more or less
Vinegar _____ 5 parts, more or less
Salt _____ Less than 1 part These constituents having been mixed are added to the cooked base after the same has been allowed to cool, and when thoroughly stirred together, the salad dressing is complete and ready to serve or bottle.

It is to be noted that only the base is cooked, while the mayonnaise addition is not cooked, but is added in a raw state.

By combining the ingredients in substantially the proportions specified, we have found that a very smooth and delicious dressing results. The proportions specified are those which are preferred, but the present invention is not to be understood as limited other than is fully commensurate with the appended claims.

Having thus fully described the invention, what we claim as new and desire to secure by Letters Patent is:

1. A salad dressing embodying a cooked base consisting of a thickening substance to which has been added mustard, salt, saffron and not substantially less than twenty parts of vinegar, and sufficient water to give the desired consistency to the mass, in combination with an uncooked composition of eggs, edible oil and vinegar, the whole being mixed to a substantially staple mayonnaise.

2. A salad dressing embodying a cooked composition of cornstarch, wheat powder, mustard, salt, vinegar, less than one part saffron and sufficient water to impart the desired consistency to the mass, in combination with an uncooked composition, added to said mass, and embodying eggs, edible oil and vinegar, the whole being mixed to a substantially staple mayonnaise.

3. A salad dressing embodying a cooked composition consisting of one to two per cent. corn starch, from one to two per cent. wheat powder, less than one per cent. of mustard, less than one per cent. of salt, less than one per cent. of saffron, between thirty and forty per cent. of vinegar, and between fifty and sixty per cent. of water with which is combined an uncooked composition comprising from ten to twenty per cent. eggs, five per cent. more or less, vinegar, and seventy-five per cent. more or lss olive oil, the whole being mixed to a substantially staple mayonnaise.

In testimony whereof, we have signed our names to this specification.

HANS JAEGER.
WALTER KUENZLER.